US012499796B1

(12) United States Patent
Hawkins

(10) Patent No.: US 12,499,796 B1
(45) Date of Patent: Dec. 16, 2025

(54) INTELLIGENT DOT MATRIX CHARACTER DISPLAY WITH NO-CODE MENU

(71) Applicant: Michael Hawkins, Sunnyvale, CA (US)

(72) Inventor: Michael Hawkins, Sunnyvale, CA (US)

( * ) Notice: Subject to any disclaimer, the term of this patent is extended or adjusted under 35 U.S.C. 154(b) by 0 days.

(21) Appl. No.: 19/067,895

(22) Filed: Mar. 1, 2025

(51) Int. Cl.
*G09G 3/04* (2006.01)
*G09G 5/24* (2006.01)
*G09G 5/34* (2006.01)

(52) U.S. Cl.
CPC ................. *G09G 3/04* (2013.01); *G09G 5/24* (2013.01); *G09G 5/34* (2013.01); *G09G 2320/0606* (2013.01); *G09G 2320/064* (2013.01); *G09G 2354/00* (2013.01); *G09G 2360/144* (2013.01); *G09G 2370/06* (2013.01)

(58) Field of Classification Search
CPC .. G09G 3/04; G09G 5/24; G09G 5/34; G09G 2320/0606; G09G 2320/064; G09G 2354/00; G09G 2360/144; G09G 2370/06
See application file for complete search history.

(56) References Cited

U.S. PATENT DOCUMENTS

| | | | | |
|---|---|---|---|---|
| 3,609,743 | A | 9/1971 | Lasoff et al. | |
| 5,890,184 | A | 3/1999 | Ooishi | |
| 9,030,376 | B2 | 5/2015 | Kim et al. | |
| 2009/0152445 | A1 * | 6/2009 | Gardner, Jr. ......... | G09G 3/3406 250/214 AL |
| 2014/0298355 | A1 * | 10/2014 | Kim ...................... | G06F 3/1454 719/313 |

FOREIGN PATENT DOCUMENTS

| | | | |
|---|---|---|---|
| JP | H03196094 | A | 8/1991 |
| JP | H06189196 | A | 7/1994 |
| WO | WO2021147830 | A1 | 7/2021 |

OTHER PUBLICATIONS

Ramesh G, 8x8 LED Matrix Max7219 Control using Android app via Bluetooh, https://www.dofbot.com/post/8x8-led-matrix-max7219-control-using-android-app-via-bluetooth ; Collected on Jul. 23, 2025; published Dec. 29, 2022 (Year: 2022).*
LED Dot Matrix Display, Embedded System Lab, accessed Oct. 9, 2025, https://labs.dese.iisc.ac.in/embeddedlab/led-dot-matrix-display-2/#:~text=In%20order%20to%20display%20a,rate%20of%20800Hz%20to%2.
Working with LED Dot Matrix Displays, Electronic Fundamentals Part 1: Monochrome dot matrix displays, accessed Oct. 9, 2025, Jameco Electronics, https://www.jameco.com/Jameco/workshop/learning-center/electronic-fundamentals-working-with-led-dot-matrix-displays.html.

* cited by examiner

*Primary Examiner* — Brent D Castiaux
(74) *Attorney, Agent, or Firm* — Edison Law Group, PLLC

(57) ABSTRACT

An abstract is presented for a method involving a graphical user interface on serial terminal emulator software for configuring display settings of a dot matrix character display device. The method enables selection of display settings through the graphical user interface without programming code or installing proprietary software. It facilitates the creation and storage of custom characters via the graphical user interface for display on the dot matrix character display device. Additionally, the method includes initiating access to an onboard I2C EEPROM through the graphical user interface to program display configurations and automatically programming the onboard I2C EEPROM based on selections within the graphical user interface.

23 Claims, 25 Drawing Sheets

```
***************MAIN MENU***************
Enter 'A' to set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed Scroll Speed
Enter 'F' to create a new Custom Character
Enter 'G' to Escape


Awaiting Entry:
A

**************BAUD RATE SELECT MENU**************
SELECT ENTRY TO CHANGE USER PROGRAMMED BAUD RATE

Enter 'A' to change Baud Rate to 38400
Enter 'B' to change Baud Rate to 31250
Enter 'C' or push Reset to escape.

Awaiting Entry:
A
You Chose 38400 BAUD.
Reset and applied changes.Exiting menu.
```

FIG. 5A

```
**************MAIN MENU***************

Enter 'A' to set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed Scroll Speed
Enter 'F' to create a new Custom Character
Enter 'G' to Escape


Awaiting Entry:
B

**************EOL TERMINATOR SELECT MENU**************
SELECT ENTRY TO CHANGE USER PROGRAMMED RxIN EOL TERMINATOR

Enter 'A' to change to <CR>
Enter 'B' to change to <LF>
Enter 'C' to change to <CR><LF>
Enter 'D' to change to <LF><CR>
Enter 'E' or push Reset to escape.


Awaiting Entry:
C

You Chose <CR><LF>
Reset and applied changes. Exiting menu.
```

FIG. 5B

```
****************BRIGHTNESS MODE CONFIGURATION MENU***************
SELECT ENTRY TO CHANGE USER PROGRAMMED BRIGHTNESS MODE SETTINGS

Enter 'A' : Set to Automatic Mode
Enter 'B' : Adjust Automatic Mode Min & Max Settings
Enter 'C' : Set Display to Fixed Brightness Mode
Enter 'D' : Adjust Fixed Brightness Setting
Enter 'E' : Set to EXT PWM Mode
Enter 'F' or push Reset to escape.

Awaiting Entry:
```

FIG. 5C

```
***************MAIN MENU***************
Enter 'A' to set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed Scroll Speed
Enter 'F' to create a new Custom Character
Enter 'G' to Escape

Awaiting Entry:
D
Enter A to enable Scrolling, or B for Non-scrolling mode:
A
User Programmed Display set to Scrolling mode.
Reset and applied changes.Exiting menu.
```

FIG. 5D

```
****************MAIN MENU***************

Enter 'A' to set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed Scroll Speed
Enter 'F' to create a new Custom Character
Enter 'G' to Escape

Awaiting Entry:
E
Enter scroll speed in seconds, from 0.10 to 1.00 seconds:
0.17
Scroll speed set to 0.17 seconds.
Reset and Applied Changes.Exiting menu.
```

FIG. 5E

```
*********TERMINAL CONNECTION SUCCESSFUL*********
                    Firmware Rev.5.4.7

********OPERATING IN MENU CONFIGURATION********
1. BAUD RATE SET TO DEFAULT 38400
2. RxIn EOL TERMINATOR SET TO DEFAULT <CR>
       (TxOut EOL Terminator is fixed at <CR><LF>)
3. BRIGHTNESS MODE SET TO AUTOMATIC LIGHT SENSOR:
       Max Display Brightness set to 100%
       Min Display Brightness set to 10%
4. DISPLAY SET TO NON-SCROLLING MODE.

******** USER PROGRAMMED CONFIGURATION SETTINGS *******
(Settings applied when Config Switch set to PRGM position)

1. USER PROGRAMMED BAUD RATE: 38400
2. USER PROGRAMMED RxIn EOL TERMINATOR: <CR><LF>
3. USER PROGRAMMED BRIGHTNESS MODE: EXTERNAL PWM
4. USER PROGRAMMED SCROLL MODE SET TO SCROLLING DISPLAY.
5. USER PROGRAMMED SCROLL SPEED SET TO 0.17 SECONDS.

***************MAIN MENU***************

Enter 'A' to set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed Scroll Speed
Enter 'F' to create a new Custom Character
Enter 'G' to Escape


Awaiting Entry:
F

*************** 5x7 CHARACTER WRITING PROGRAM ***************

34 Custom Characters are available, using ASCII numbers 128-161.

Enter the ASCII Number:
130
You entered: 130
Accept Entry? (must enter Y or N):
Y

ASCII Number 130 has been assigned to this character.
```

FIG. 5F

```
***     ROW DATA ENTRY SECTION ****

Entries must be made as a five-bit Binary number.
Enter Data for Row 1:
00000

You entered BINARY: 00000
Accept Entry? (must enter Y or N):
Y
Enter Data for Row 2:
01010

You entered BINARY: 01010
Accept Entry? (must enter Y or N):
Y
Enter Data for Row 3:
10101

You entered BINARY:10101
Accept Entry? (must enter Y or N):
Y
Enter Data for Row 4:
10001

You entered BINARY:10001
Accept Entry? (must enter Y or N):
Y
Enter Data for Row 5:
01010

You entered BINARY: 01010
Accept Entry? (must enter Y or N):
Y
Enter Data for Row 6:
00100

You entered BINARY: 00100
Accept Entry? (must enter Y or N):
Y
Enter Data for Row 7:
00000

You entered BINARY: 00000
Accept Entry? (must enter Y or N):
Y
Row Data Entry Completed

Programming User EEPROM ASCII 130 completed.
Reset and applied changes. Exiting menu.
```

FIG. 5F (Cont.)

```
*************MAIN MENU***************

Enter 'A' to set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed Scroll Speed
Enter 'F' to create a new Custom Character
Enter 'G' to Escape


Awaiting Entry:
C

****************BRIGHTNESS MODE CONFIGURATION MENU***************
SELECT ENTRY TO CHANGE USER PROGRAMMED BRIGHTNESS MODE SETTINGS

Enter 'A' : Set to Automatic Mode
Enter 'B' : Adjust Automatic Mode Min & Max Settings
Enter 'C' : Set Display to Fixed Brightness Mode
Enter 'D' : Adjust Fixed Brightness Setting
Enter 'E' : Set to EXT PWM Mode
Enter 'F' or push Reset to escape.


Awaiting Entry:
A
Light Sensor set to Automatic Mode.
Reset and applied changes.Exiting menu.
```

FIG. 6A

```
****************BRIGHTNESS MODE CONFIGURATION MENU***************
SELECT ENTRY TO CHANGE USER PROGRAMMED BRIGHTNESS MODE SETTINGS

Enter 'A' : Set to Automatic Mode
Enter 'B' : Adjust Automatic Mode Min & Max Settings
Enter 'C' : Set Display to Fixed Brightness Mode
Enter 'D' : Adjust Fixed Brightness Setting
Enter 'E' : Set to EXT PWM Mode
Enter 'F' or push Reset to escape.


Awaiting Entry:
B
*******Automatic Mode Min and Max Settings Menu*******

******Set Max Brightness Level*******
Must enter an integer number from 2 to 100.
Input Max Brightness%:
97
Max Brightness programmed to 97 %

******Set Min Brightness Level*******
Must enter an integer number from 1 to something less than Max Brightness.
Input Min Brightness%:
10
Min Brightness programmed to 10 %

Reset and applied changes. Exiting menu.
```

FIG. 6B

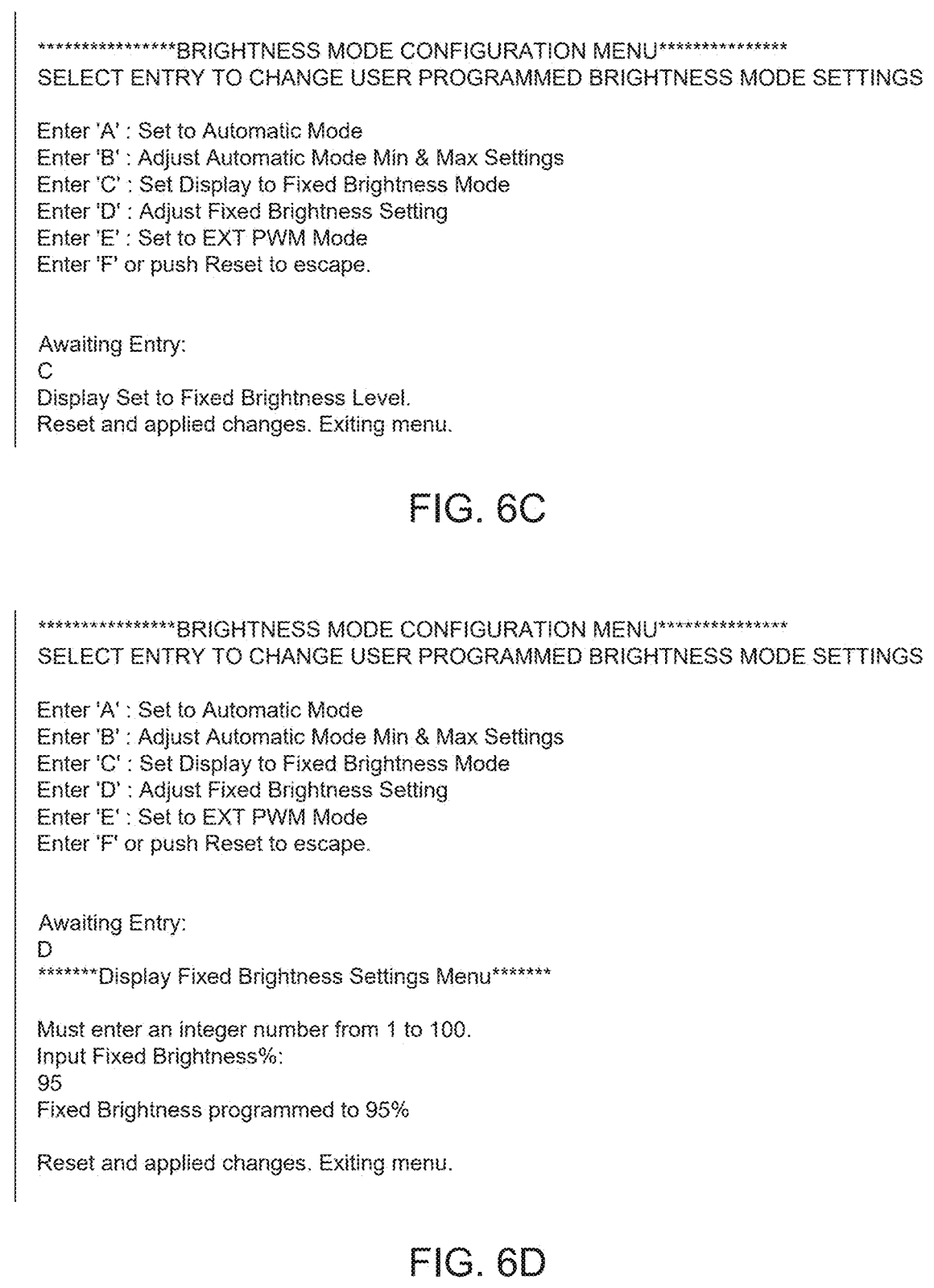

```
****************BRIGHTNESS MODE CONFIGURATION MENU***************
SELECT ENTRY TO CHANGE USER PROGRAMMED BRIGHTNESS MODE SETTINGS

Enter 'A' : Set to Automatic Mode
Enter 'B' : Adjust Automatic Mode Min & Max Settings
Enter 'C' : Set Display to Fixed Brightness Mode
Enter 'D' : Adjust Fixed Brightness Setting
Enter 'E' : Set to EXT PWM Mode
Enter 'F' or push Reset to escape.


Awaiting Entry:
C
Display Set to Fixed Brightness Level.
Reset and applied changes. Exiting menu.
```

FIG. 6C

```
****************BRIGHTNESS MODE CONFIGURATION MENU***************
SELECT ENTRY TO CHANGE USER PROGRAMMED BRIGHTNESS MODE SETTINGS

Enter 'A' : Set to Automatic Mode
Enter 'B' : Adjust Automatic Mode Min & Max Settings
Enter 'C' : Set Display to Fixed Brightness Mode
Enter 'D' : Adjust Fixed Brightness Setting
Enter 'E' : Set to EXT PWM Mode
Enter 'F' or push Reset to escape.


Awaiting Entry:
D
*******Display Fixed Brightness Settings Menu*******

Must enter an integer number from 1 to 100.
Input Fixed Brightness%:
95
Fixed Brightness programmed to 95%

Reset and applied changes. Exiting menu.
```

FIG. 6D

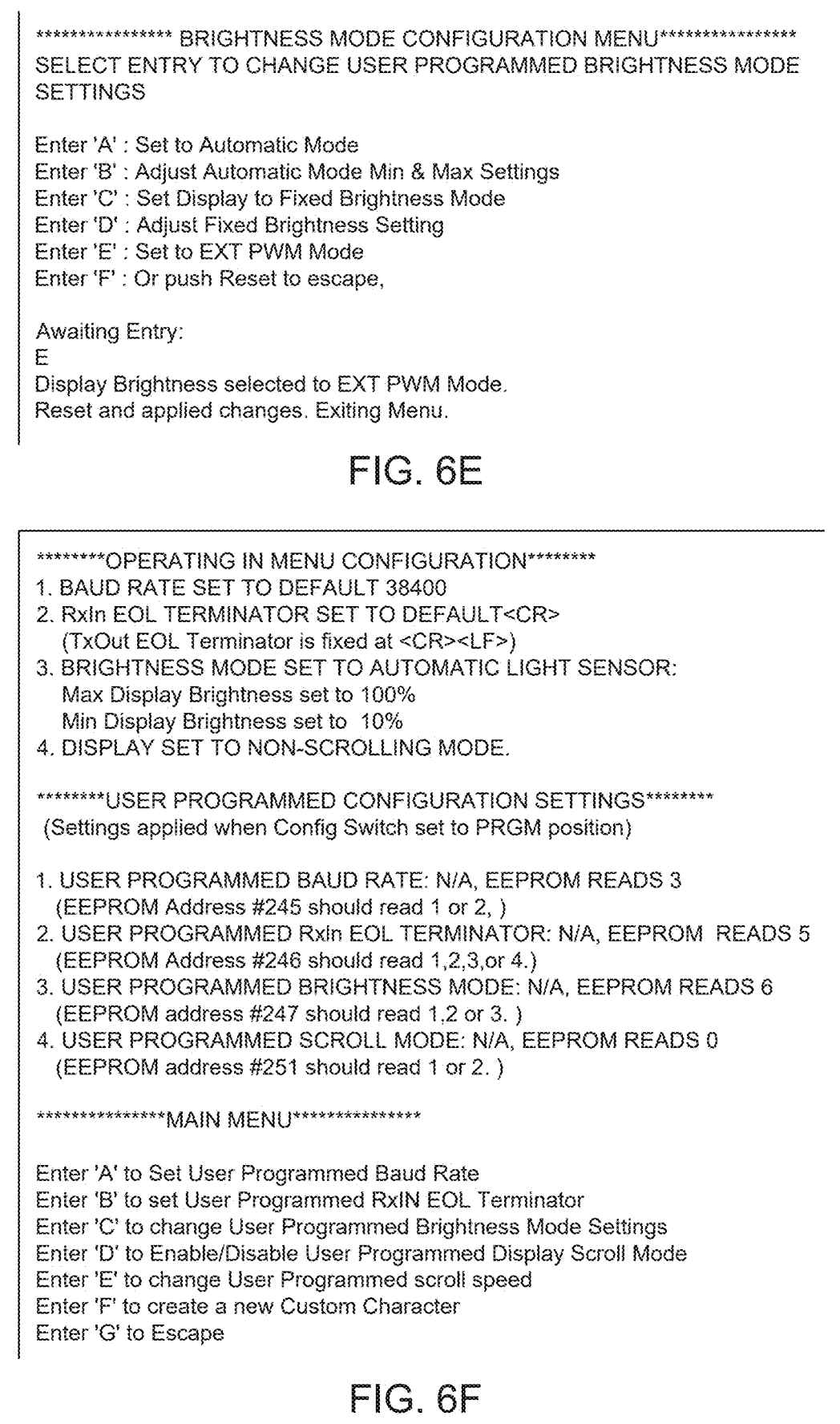

```
**************** BRIGHTNESS MODE CONFIGURATION MENU****************
SELECT ENTRY TO CHANGE USER PROGRAMMED BRIGHTNESS MODE
SETTINGS

Enter 'A' : Set to Automatic Mode
Enter 'B' : Adjust Automatic Mode Min & Max Settings
Enter 'C' : Set Display to Fixed Brightness Mode
Enter 'D' : Adjust Fixed Brightness Setting
Enter 'E' : Set to EXT PWM Mode
Enter 'F' : Or push Reset to escape,

Awaiting Entry:
E
Display Brightness selected to EXT PWM Mode.
Reset and applied changes. Exiting Menu.
```

FIG. 6E

```
********OPERATING IN MENU CONFIGURATION********
1. BAUD RATE SET TO DEFAULT 38400
2. RxIn EOL TERMINATOR SET TO DEFAULT<CR>
   (TxOut EOL Terminator is fixed at <CR><LF>)
3. BRIGHTNESS MODE SET TO AUTOMATIC LIGHT SENSOR:
   Max Display Brightness set to 100%
   Min Display Brightness set to  10%
4. DISPLAY SET TO NON-SCROLLING MODE.

********USER PROGRAMMED CONFIGURATION SETTINGS********
 (Settings applied when Config Switch set to PRGM position)

1. USER PROGRAMMED BAUD RATE: N/A, EEPROM READS 3
  (EEPROM Address #245 should read 1 or 2, )
2. USER PROGRAMMED RxIn EOL TERMINATOR: N/A, EEPROM  READS 5
  (EEPROM Address #246 should read 1,2,3,or 4.)
3. USER PROGRAMMED BRIGHTNESS MODE: N/A, EEPROM READS 6
  (EEPROM address #247 should read 1,2 or 3. )
4. USER PROGRAMMED SCROLL MODE: N/A, EEPROM READS 0
  (EEPROM address #251 should read 1 or 2. )

***************MAIN MENU***************

Enter 'A' to Set User Programmed Baud Rate
Enter 'B' to set User Programmed RxIN EOL Terminator
Enter 'C' to change User Programmed Brightness Mode Settings
Enter 'D' to Enable/Disable User Programmed Display Scroll Mode
Enter 'E' to change User Programmed scroll speed
Enter 'F' to create a new Custom Character
Enter 'G' to Escape
```

FIG. 6F

| ADDRESS# | FUNCTION | CONTENTS |
|---|---|---|
| | | |
| 0-237 | CUSTOM CHARACTER FONT DATA | ROW DATA FOR 34 CUSTOM CHARACTERS, ASCII 128-161 |
| 238-244 | USER DEFINED | USER DEFINED |
| 245 | BAUD RATE CODE NUMBER | 01=38400 02=31250 |
| 246 | EOL TERMINATOR CODE NUMBER | 01=<CR> 02=<LF> 03=<CR><LF> 04=<LF><CR> |
| 247 | LIGHT SENSOR MODE CODE NUMBER | 01=AUTO MODE 02=FIXED BRIGHTNESS MODE 03=EXTERNAL PWM MODE |
| 248 | FIXED BRIGHTNESS LEVEL | INTEGER NUMBER 1-100 |
| 249 | MIN BRIGHTNESS LEVEL | INTEGER NUMBER 1-100 |
| 250 | MAX BRIGHTNESS LEVEL | INTEGER NUMBER 1-100 |
| 251 | SCROLL ENABLE | 01=SCROLLING DISPLAY 02=NON-SCROLLING DISPLAY |
| 252 | SCROLL SPEED | INTEGER NUMBER 11 TO 112 |
| 253-255 | USER DEFINED | USER DEFINED |
| | | |
| | | |

FIG. 7

| | COL 1 | COL 2 | COL 3 | COL 4 | COL 5 | | |
|---|---|---|---|---|---|---|---|
| ROW 1 | 0 | 0 | 0 | 0 | 0 | | ROW 1 DATA: 00000 |
| ROW 2 | 0 | 1 | 0 | 1 | 0 | | ROW 2 DATA: 01010 |
| ROW 3 | 1 | 0 | 1 | 0 | 1 | | ROW 3 DATA: 10101 |
| ROW 4 | 1 | 0 | 0 | 0 | 1 | | ROW 4 DATA: 10001 |
| ROW 5 | 0 | 1 | 0 | 1 | 0 | | ROW 5 DATA: 01010 |
| ROW 6 | 0 | 0 | 1 | 0 | 0 | | ROW 6 DATA: 00100 |
| ROW 7 | 0 | 0 | 0 | 0 | 0 | | ROW 7 DATA: 00000 |

FIG. 8

INTELLIGENT DOT MATRIX CHARACTER DISPLAY WITH NO-CODE MENU

TECHNICAL FIELD

The present invention relates generally to display technologies, and more particularly, to systems and methods providing for easy configuration of dot matrix character display devices without requiring programming knowledge.

BACKGROUND

In the realm of digital display technology, particularly with dot matrix character displays, the standard method of data signal conversion and display configuration has been extensively reliant on specialized drivers and integrated circuits (ICs). Such drivers are critical for translating data signals into readable formats that can be visually represented on a display device. The integration and implementation of these drivers often require a significant degree of technical expertise in embedded software packages, which poses a considerable challenge for users without a background in electronics or software engineering. This complexity limits the accessibility of dot matrix display technology to a narrow segment of users, primarily those with specialized training or resources to hire skilled personnel. Furthermore, the conventional approach to configuring these display devices typically involves programming the device directly through code. This requires not only a deep understanding of the programming languages involved but also familiarity with the specific hardware being used. The process is time-consuming and prone to errors, especially for those without extensive experience in coding or electronics. The barrier to entry is high, deterring small companies and hobbyists from utilizing dot matrix displays in their projects or products despite the potential benefits they offer. Another critical issue with the current state of the art is the lack of flexibility in configuring display settings and creating custom characters. Most existing devices demand either the use of proprietary software or intricate manual coding to alter display parameters such as brightness, baud rate, or to design custom characters. No-code proprietary software, when available, tends to be complicated to learn and use, and may or may not work on the user's required operating system. The technical demands of these methods significantly limit the creative and practical utility of dot matrix character displays. Additionally, the customization and configuration of display settings are often constrained by the hardware design, such as the requirement for physical dip switches or jumpers on the device. This approach lacks the intuitiveness and ease of use that could be achieved through a more interactive and user-friendly interface. Users seeking to adjust display settings must typically do so through physical adjustments on the hardware, a method that is both outdated and limited in its capacity for precision and flexibility. The method described herein is for a device which only requires the installation of a serial terminal emulator along with virtual com port installation, both of which can be obtained as non-proprietary freeware. These are available for use on a wide variety of operating systems. Using this approach means that no proprietary software is used or required, and the device will work on any operating system for which there are serial terminal emulators and virtual com port drivers available. The user interface has been designed to be intuitive, with virtually no learning curve required.

While coding may be employed on the device to directly program it, methods described herein have been employed to greatly minimize the technical threshold required for such programming. Furthermore, the development and production of the type of device described herein does not require the added expense of having to develop, test, and keep updated high-level proprietary software which, in order to obtain maximum market exposure, must also be able to work on a variety of operating system platforms.

SUMMARY

The appended claims may serve as a summary of this application.

BRIEF DESCRIPTION OF THE DRAWINGS

The present disclosure will become better understood from the detailed description and the drawings, wherein:

FIGS. 5A-5F are diagrams illustrating various sub-menu interfaces for the control/adjustment of various device features, in accordance with some embodiments.

FIGS. 6A-6F are diagrams illustrating various sub-menu interfaces for the control/adjustment of various device features, in accordance with some embodiments.

FIG. 7 is a diagram illustrating an example of the memory map of the on-board EEPROM which is used to store configuration settings and user information, in accordance with some embodiments.

FIG. 8 is a graphical depiction of a custom "heart" character created by a user entering row data, in accordance with some embodiments.

DETAILED DESCRIPTION

Figure 1:
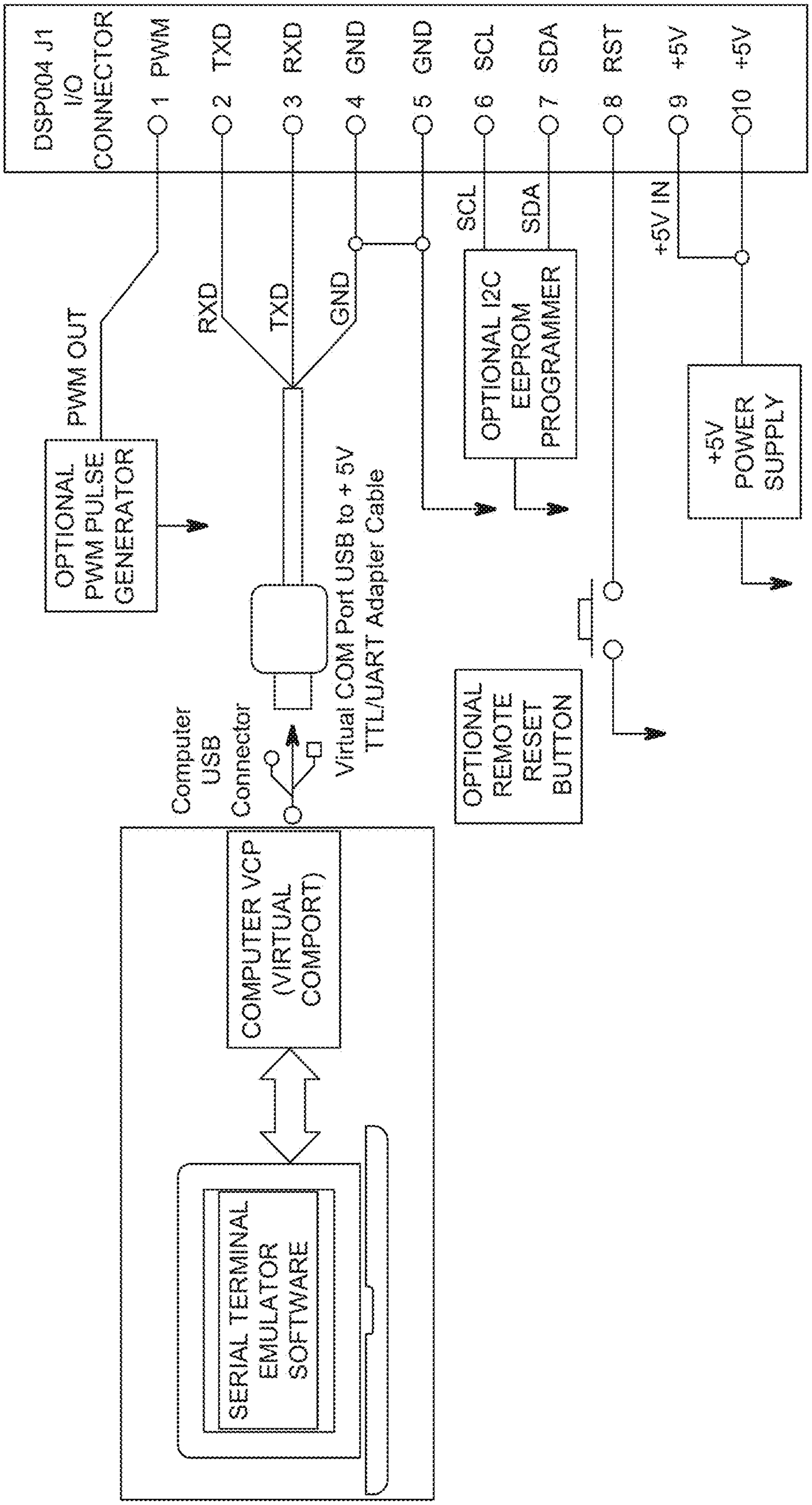
FIG. 1 is a diagram illustrating a development setup for a dot matrix display with no-code menu, in accordance with some embodiments.

In this specification, reference is made in detail to specific embodiments of the disclosure. Some of the embodiments or their aspects are illustrated in the drawings.

For clarity in explanation, the disclosure has been provided with reference to specific embodiments, however it should be understood that the disclosure is not limited to the described embodiments. On the contrary, the disclosure covers alternatives, modifications, and equivalents as may be included within its scope as defined by any patent claims. The following embodiments of the disclosure are set forth without any loss of generality to, and without imposing limitations on, the disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In one embodiment, the system includes a graphical user interface on serial terminal emulator software to set up display settings on a dot matrix character display device. It allows users to select display settings such as baud rate and end of line terminator easily without needing to code. The system also makes it easy to create and save custom characters for the display device using this interface. Users can start programming the device's onboard I2C EEPROM directly through the interface to set up display configurations. The EEPROM gets programmed automatically based on choices made in the interface. A communication link is created between the dot matrix display device and a computer using a USB to 5V Serial UART adaptor cable. In some embodiments, the USB to UART adaptor used may employ different logic voltages, such as, for example, 1.8V or 3.3V. A menu function on the display device can be activated to bring up the graphical user interface with a simple physical action. Lastly, the display settings and custom characters set by the user are saved on the I2C EEPROM, so the display device can use them.

In some embodiments, the USB to +5V TTL/UART converter circuitry, instead of being integrated inside of a special USB adapter cable, is instead integrated onto the display board itself, thereby allowing the computer-to-display connection to be made using a standard USB cable, that is, one that has no adapter circuitry within it.

Further areas of applicability of the present disclosure will become apparent from the remainder of the detailed description, the claims, and the drawings. The detailed description and specific examples are intended for illustration only and are not intended to limit the scope of the disclosure.

FIG. 1 is a diagram illustrating a development setup for a dot matrix display with no-code menu, in accordance with some embodiments. The illustration depicts a development setup designed to configure the dot matrix character display with a no-code menu. The depicted embodiment enables users to make adjustments to the display through a computer's virtual COM port established on a standard laptop computer. To facilitate communication between the laptop and the display, a serial terminal emulator program is run on the laptop. The physical connection between these two devices is established through a USB to TTL/UART adaptor cable. This adaptor cable translates the USB signal transmitted by the computer into a compatible format (TTL/UART) that the display can understand. Power is provided by a separate +5V 1.5 A supply.

The serial terminal emulator software operates on standard computing devices, including personal computers and laptops. This software acts as a bridge, translating user inputs from the graphical user interface into commands that the dot matrix character display device can understand and execute. The implementation of this interface does not require the installation of device-specific drivers or additional software beyond the serial terminal emulator and/or Virtual Com Port driver.

In some embodiments, an MCU/I2C EEPROM programmer connection is included. This connection enables users with the ability to directly program the on-board EEPROM chip embedded within the dot matrix display without having to use the UI. This EEPROM chip serves as storage for custom settings and characters, allowing for a high degree of personalization.

In some embodiments, an MCU/PWM pulse generator connection is included. This connection enables the ability to control the brightness of the dot matrix display using pulse-width modulation (PWM).

In some embodiments, a connection is included which provides a method for resetting the dot matrix display if needed.

Figure 3A:
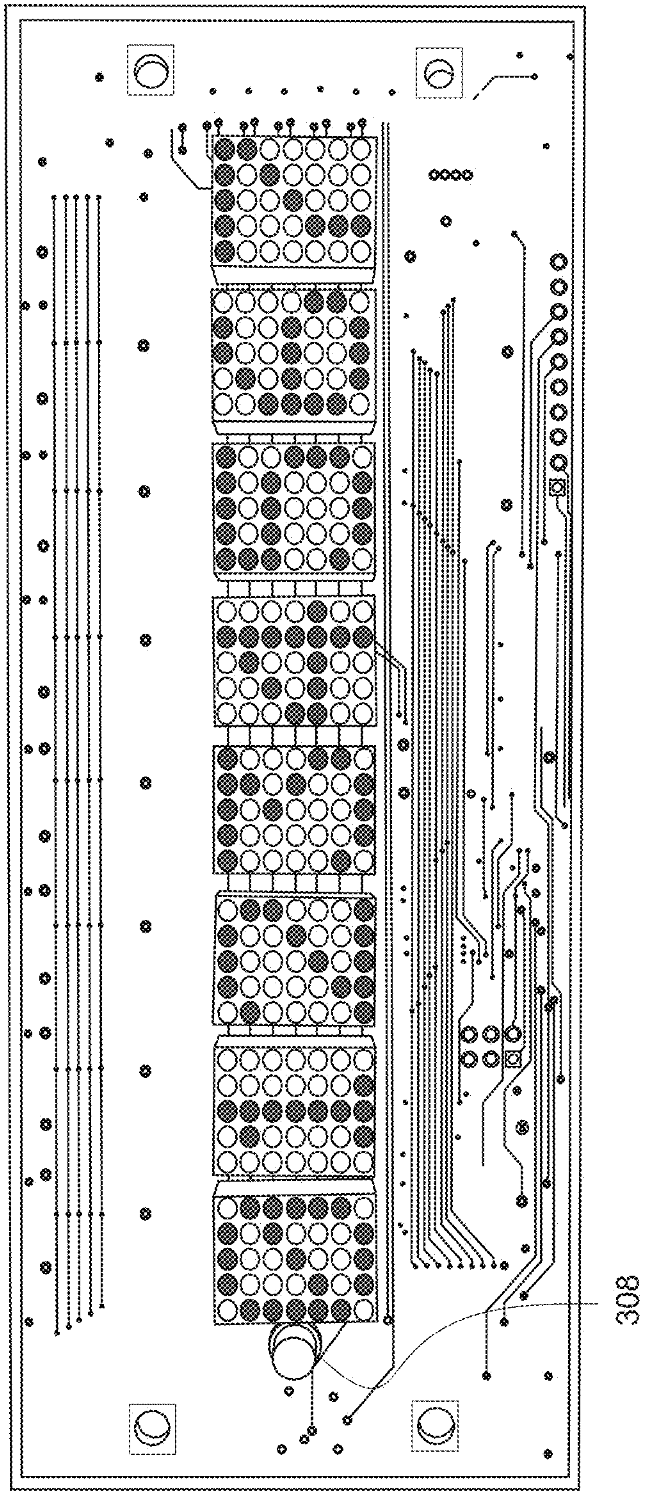
FIG. 3A is a diagram illustrating an example of the front of the dot matrix character display device, in accordance with some embodiments.

FIG. 3A is a diagram illustrating an example of the front of a dot matrix character display device, in accordance with some embodiments. The diagram depicts physical hardware for an 8× character dot matrix display device. The front of the display features the 8× character dot matrix display with individual round LEDs. Also visible is the ambient light sensor 308.

Figure 3B:
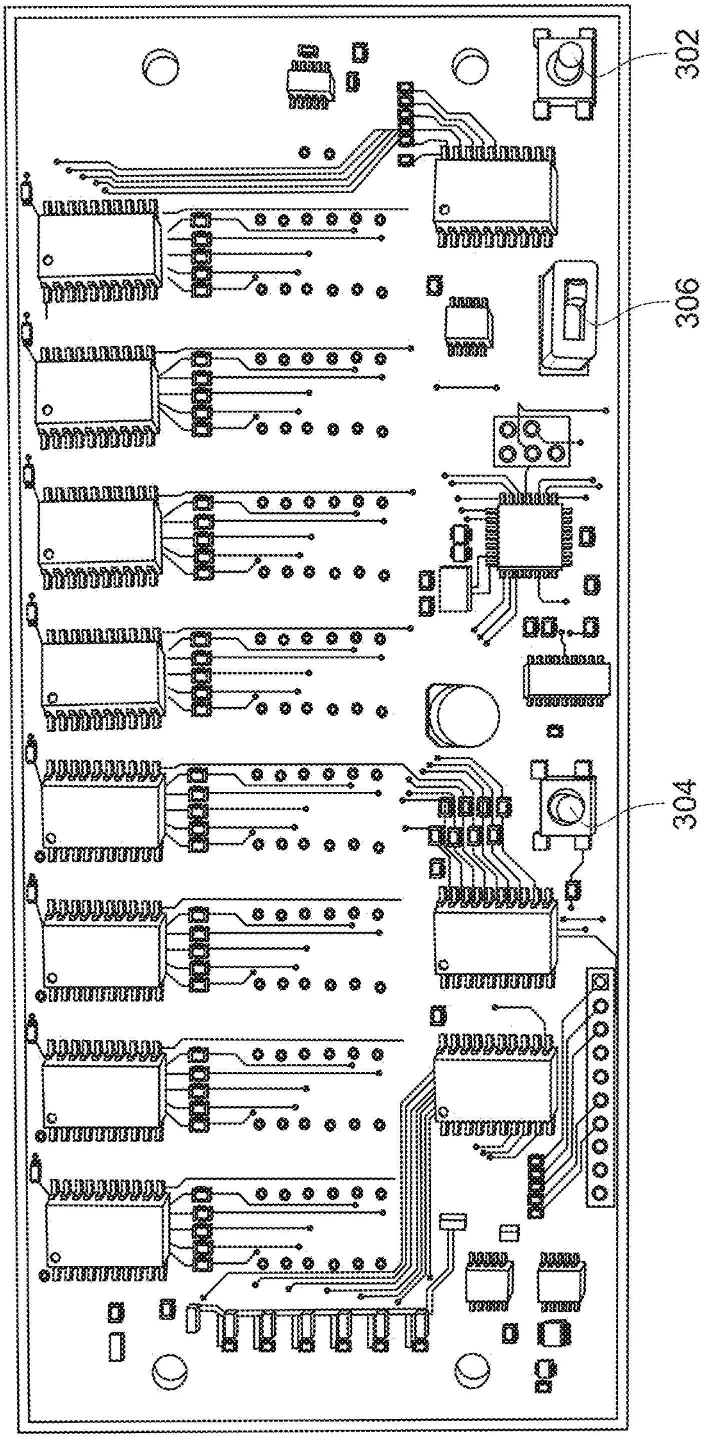
FIG. 3B is a diagram illustrating an example of the back of the dot matrix character display device, in accordance with some embodiments.

FIG. 3B is a diagram illustrating an example of the back of the dot matrix character display device from FIG. 3A, in accordance with some embodiments. The back of the dot matrix display device contains several components that facilitate power and data input. Among the components is a "MENU" button 302 on the back of the unit. Pushing this button enables two-way communication between the device and a connected computer. In some embodiments, the computer may be connected via a USB port, via a cable such as, for example, a USB to 5V Serial UART adaptor cable. Such an adaptor cable may effectively change the USB port to a virtual COM port, which may then be accessed using a serial terminal computer application such as, e.g., YAT (Yet Another Terminal) or PuTTy. In some embodiments, the USB to UART adapter used may employ different logic voltages, such as, for example, 1.8V or 3.3V. The two-way communication facilitated by pushing the "MENU" button 302 results in a menu being displayed in the terminal emulator.

In some embodiments, in addition to the "MENU" button 302, a "RESET" button 304 is featured on the back of the device. This button allows the user to restart the device if it malfunctions or an error is encountered. In some embodiments, a "CONFIG" toggle switch 306 is included on the back of the device. This switch may be toggled between a "PRGM", or program, setting or a "NORM" or normal operation setting. In the "NORM" setting, the unit operates only in factory default configuration. In some embodiments, only in this position can the UI menu be activated by pushing the MENU button. In the "PRGM" setting, the unit operates under a custom configuration programmed by the user, such programming being accomplished either by means of the UI menu or by directly having programmed the EEPROM using the I2C connections (Refer to FIG. 1).

Figure 4:
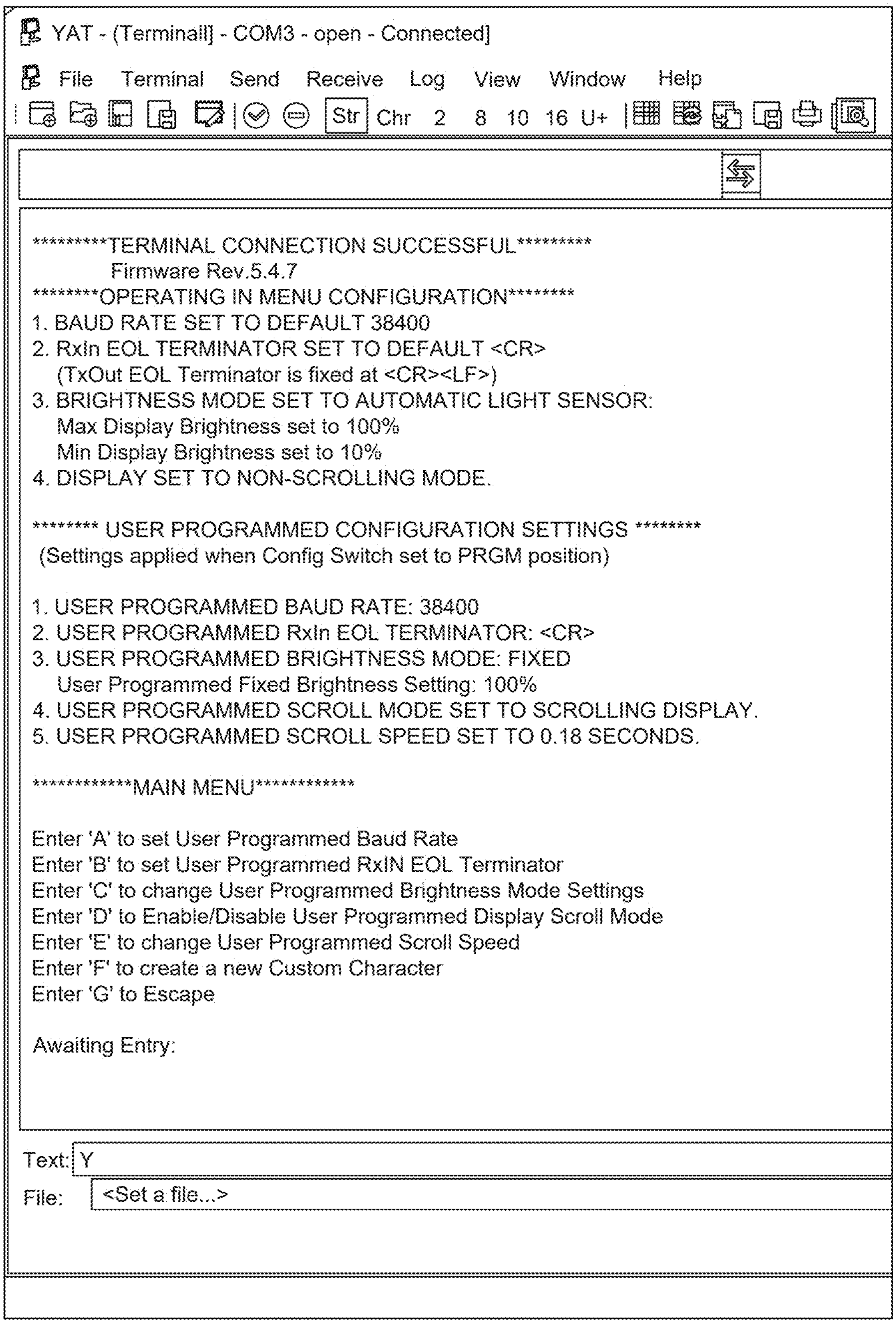
FIG. 4 is a diagram illustrating an example of a menu interface being displayed within a serial terminal emulator application, in accordance with some embodiments.

FIG. 4 is a diagram illustrating an example of a menu interface being displayed within a serial terminal emulator application, in accordance with some embodiments. The particular terminal emulator used in this example is YAT. This menu is designed to configure a dot matrix character display without requiring any coding expertise. The menu is accessed through a virtual COM port on a standard computer, as described with respect to FIG. 1. The first header listings in this example reading "OPERATING IN MENU CONFIGURATION" are related to general menu configuration settings for the dot matrix display. The "Menu Configuration" is an unchangeable factory default configuration that the unit always operates in, in order for the menu to be read. These factory default settings for baud rate, EOL terminator, light sensor settings, and scroll mode settings are displayed under this header as a reference for the user. The second header listing in this example, reading "USER PROGRAMMED CONFIGURATION SETTINGS", reads out the current user-programmed settings for the unit, under which the unit will begin operating when the CONFIG switch is thrown to the "PRGM" position. A main menu is also featured, including options to allow a user to configure a different baud rate, configure a different end-of-line terminator, change brightness mode settings, create a new custom character for the dot matrix display, or change scroll mode and scroll speed.

Figure 2A:
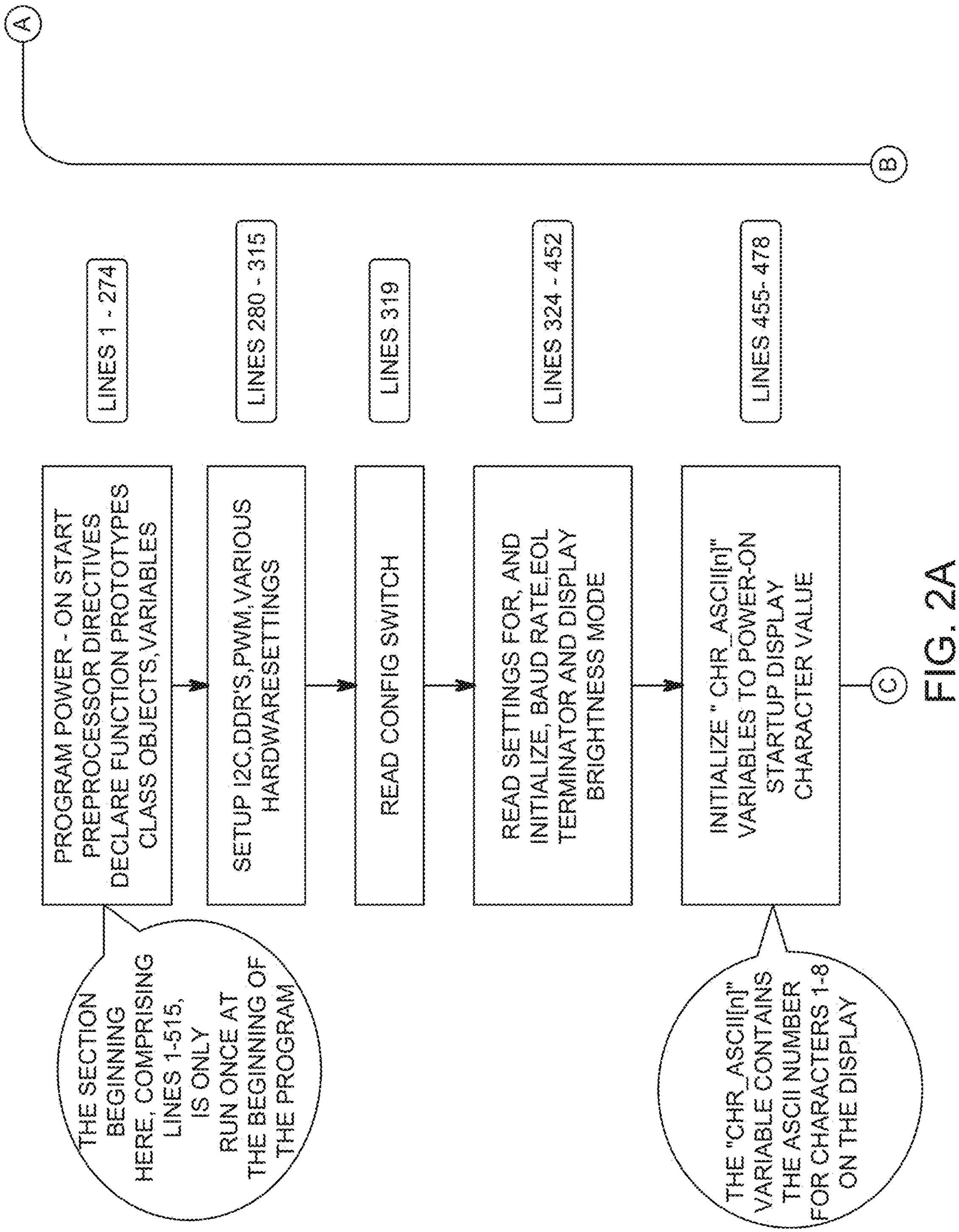
FIG. 2A is a high-level flow chart showing the entirety of the device firmware, in accordance with some embodiments.
Figure 2A:
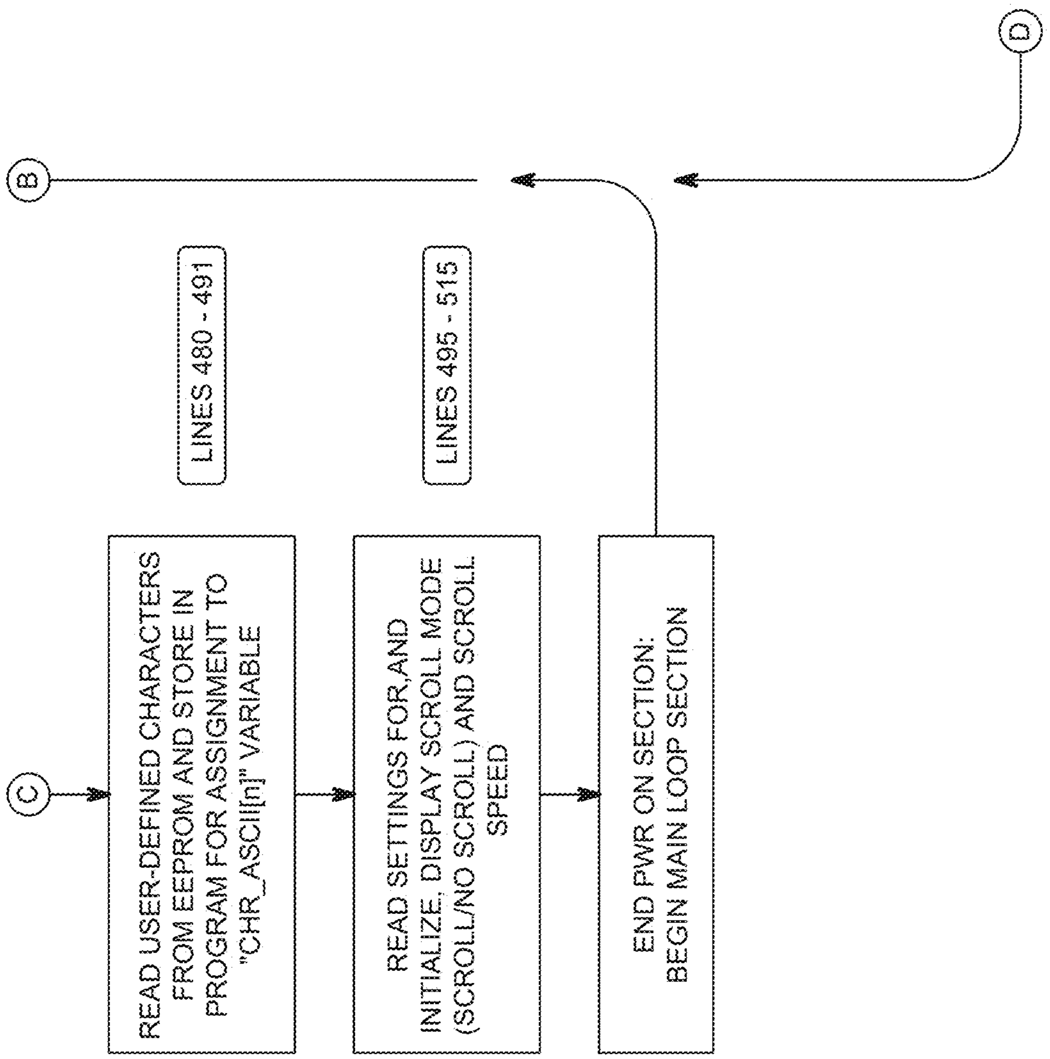
Figure 2A:
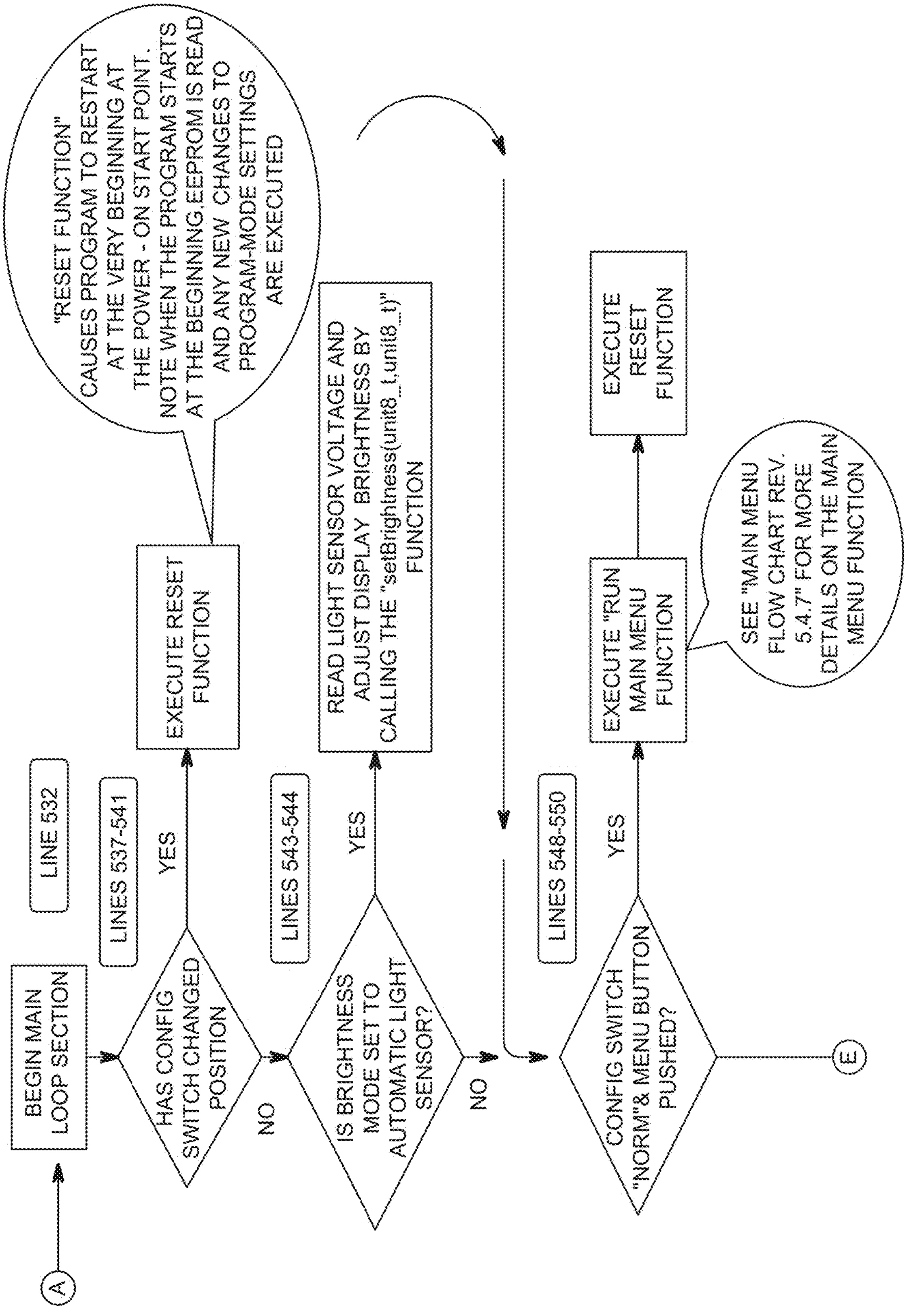
Figure 2A:
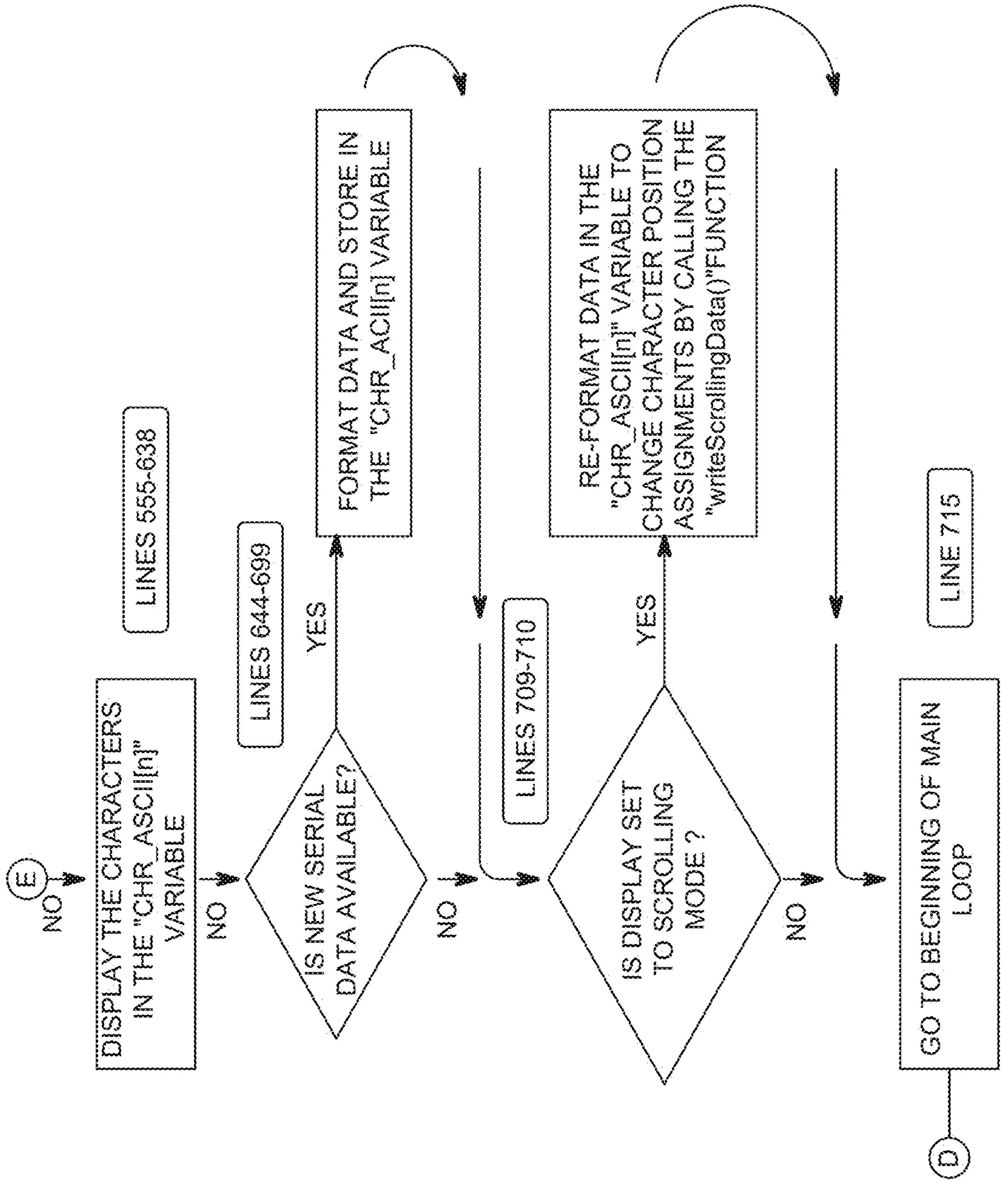

Referring now to FIG. 2A, this flowchart covers the entirety of the device firmware, and provides the appropriate context from which to understand the operation of various programming embodiments of the device. Of particular relevance to this application is the decision branch at line block 548-550, "CONFIG SWITCH "NORM" & MENU BUTTON PUSHED". A "YES" condition will result in the "RUN MAIN MENU" function to be called, which includes the various UI menu embodiments described herein. Of additional interest are the line blocks 324-452, 480-491, and 495-515, where user entries, having been set by means of UI or optional EEPROM programming, are read from the on-board EEPROM and applied in the firmware. The EEPROM is non-volatile and thereby retains the information after power has been turned off. Note these EEPROM readings occur on initial power up, or whenever the unit is reset, or at the end of user-input menus, or whenever the CONFIG switch is thrown to a different position (see decision branch "HAS CONFIG SWITCH CHANGED POSITION?"). Reading the EEPROM in this manner ensures the user changes are automatically applied in the firmware without any further intervention required by the user.

All configurations made through the graphical user interface are saved to a non-volatile onboard I2C EEPROM. This ensures that settings and custom characters persist after the device is powered down or restarted. The firmware automatically applies these configuration instructions stored in the EEPROM upon the device's next startup, ensuring continuity of user-defined settings.

All configuration settings and custom character information may also be directly written into the on-board EEPROM using the EEPROM SCL/SDA connections as shown in FIG. 1. Programming in this way allows the user to bypass the UI, and thereby provides the capability of programming large numbers of displays in a fast and automated manner, if so desired. Refer to FIG. 7, which is a memory map of the on-board EEPROM. Note that configuration settings can be made by simply writing integer number values into specific EEPROM addresses, with each address having its own unique single functionality. The unique and single functionality of each setting address lowers the technical threshold required to successfully program the device by rendering unnecessary any bit-masking techniques or other complications associated with the standard practice of using a single address that has assigned to it more than one functionality. Additional unused addresses have been made available for any user-defined purposes.

The paragraphs to follow will explain in more detail the various UI menus and sub-menus which become available when the "MENU" function is invoked, and they refer to flowchart FIG. 2B and FIG. 5A through FIG. 5E.

Figure 2B:
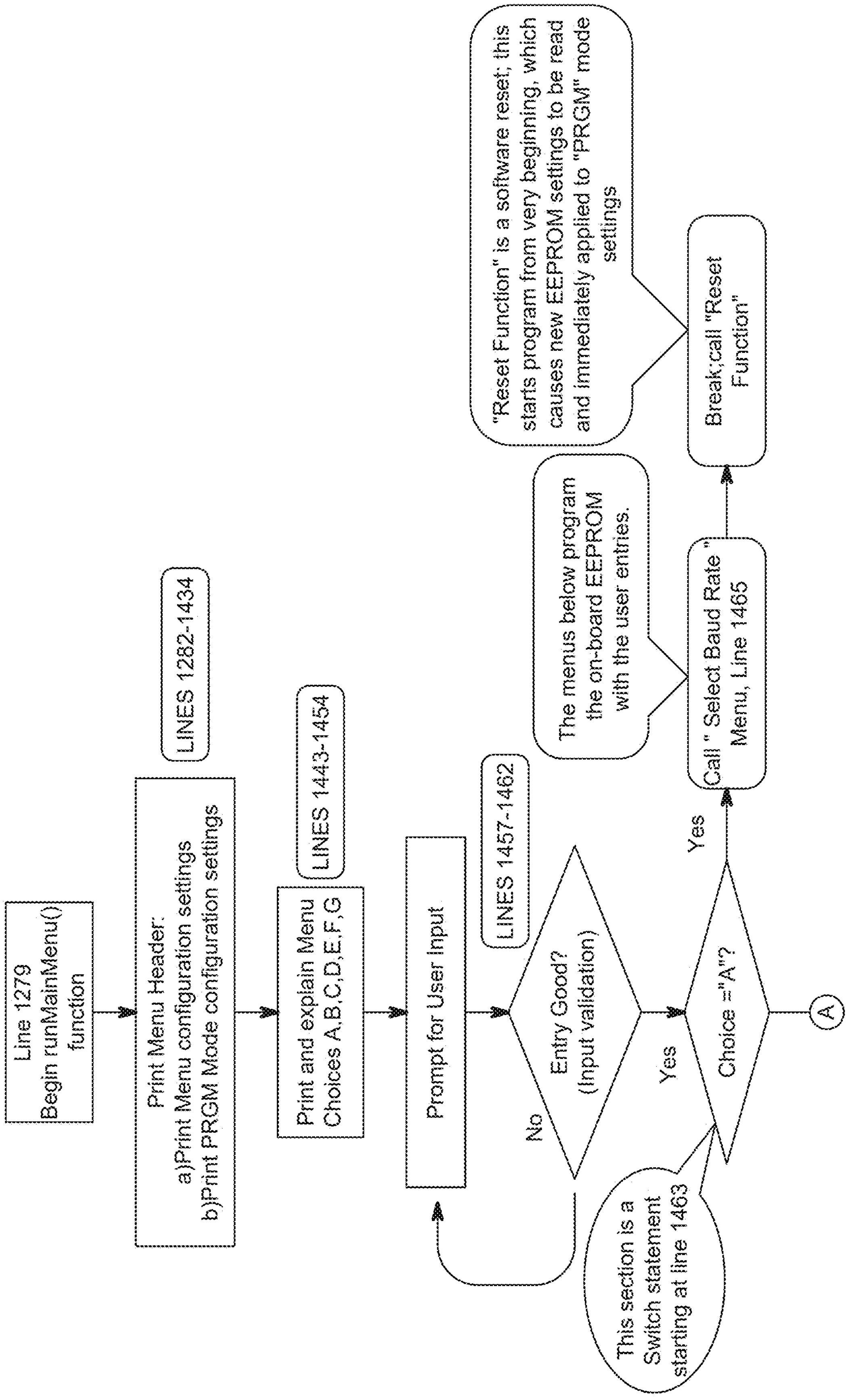
FIG. 2B is a more detailed flow chart of the device firmware, showing the menu display function, in accordance with some embodiments
Figure 2B:
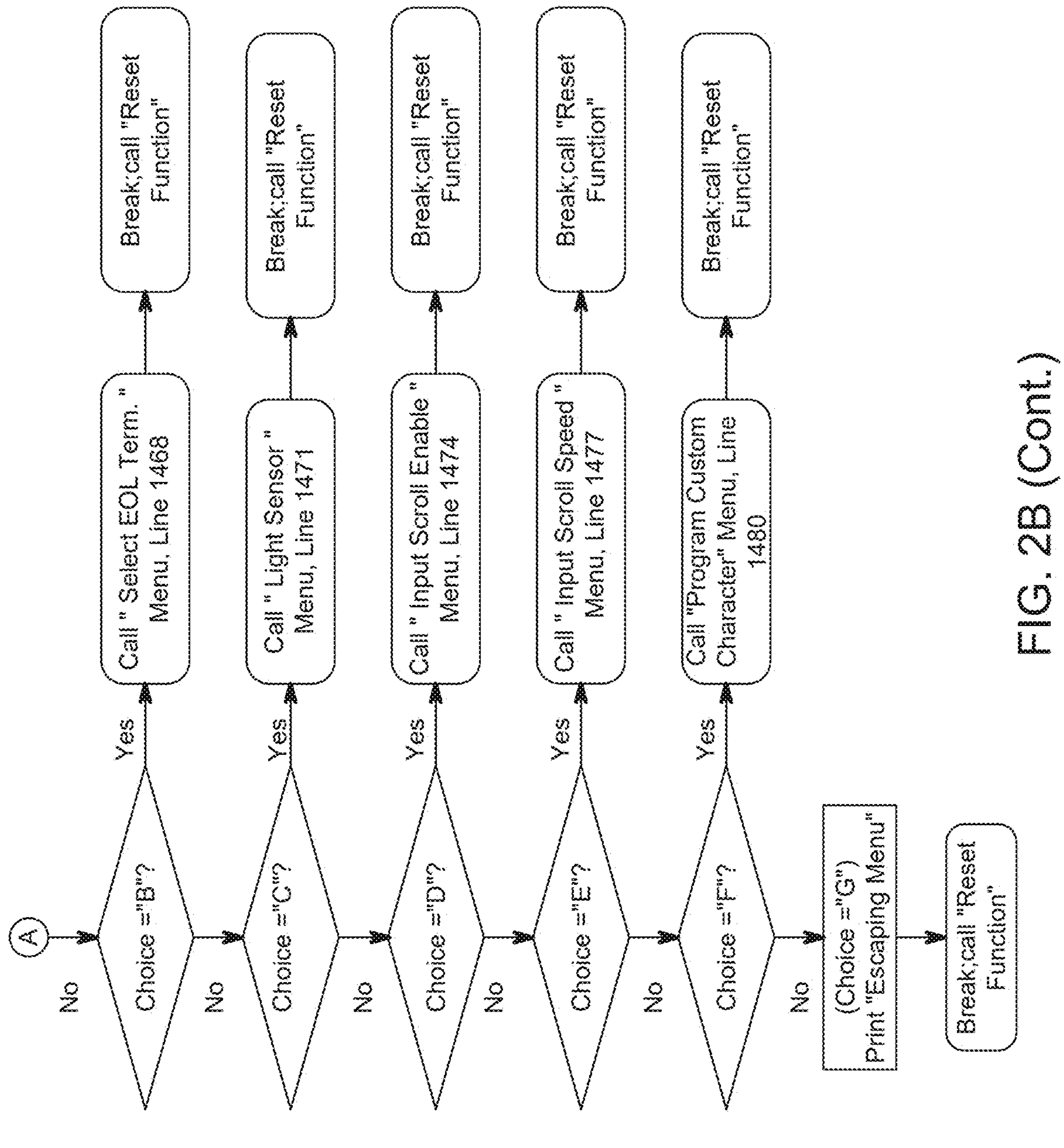

Referring to flowchart FIG. 2B, the Main Menu function flowchart, at choice "A" of the switch statement, an embodiment includes the selection of the baud rate to be used when engaging in serial communication to the display. This choice will activate a sub-menu which will allow the user to choose an appropriate selection. Refer to FIG. 5A for a screenshot of the baud rate selection menu. The unit will operate using the baud rate that has been selected when the CONFIG switch is placed in the PRGM position.

Refer to flowchart FIG. 2B, the Main Menu function flowchart. At choice "B" of the switch statement, an embodiment includes the selection of the end of line terminator to be used when engaging in serial communication to the display. This choice will activate a sub-menu which will allow the user to choose an appropriate selection. Refer to FIG. 5B for a screenshot of the end of line terminator selection menu. The unit will operate using the end of line terminator that has been selected when the CONFIG switch is placed in the PRGM position.

Refer to flowchart FIG. 2B, the Main Menu function flowchart. At choice "C" of the switch statement, an embodiment includes customization of the display and extends to modifying brightness and brightness control methods through the interface. This allows users to adjust the display appearance based on specific requirements or preferences. Changes are implemented directly without the need for external programming tools or specialized knowledge. This choice will activate a sub-menu which will allow the user to make appropriate entries utilizing the UI. The flowchart for the sub-menu is FIG. 2C. The sub-menu is called at line block 1588-1600 of this flowchart. This large sub-menu is explained in more detail in paragraphs 39 through 43 below. Refer to FIG. 5C for a screenshot of the Light Sensor Main Menu Header.

Figure 2C:
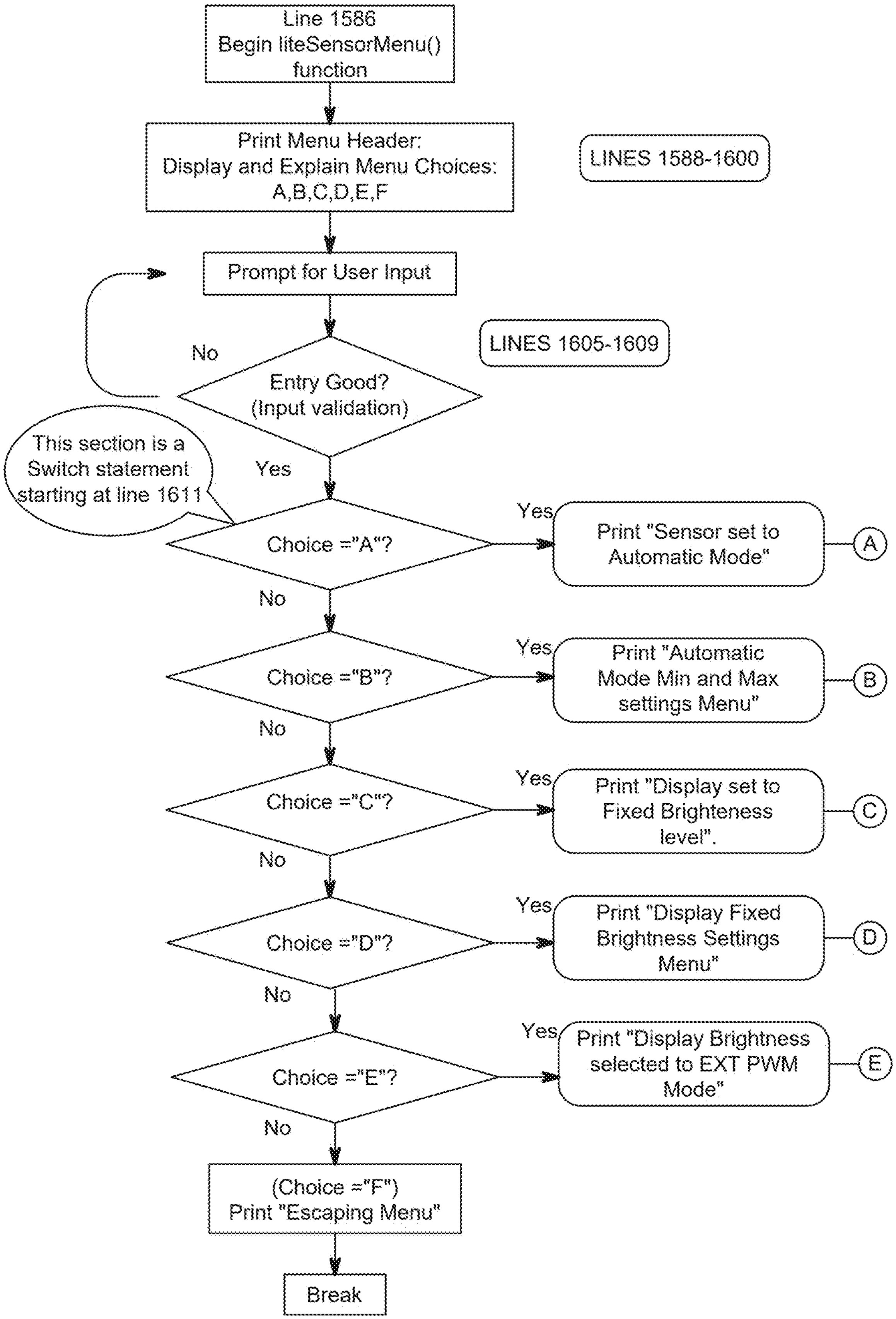
FIG. 2C is a more detailed flowchart of the device firmware, showing the light sensor mode and adjustment features, in accordance with some embodiments.
Figure 2C:
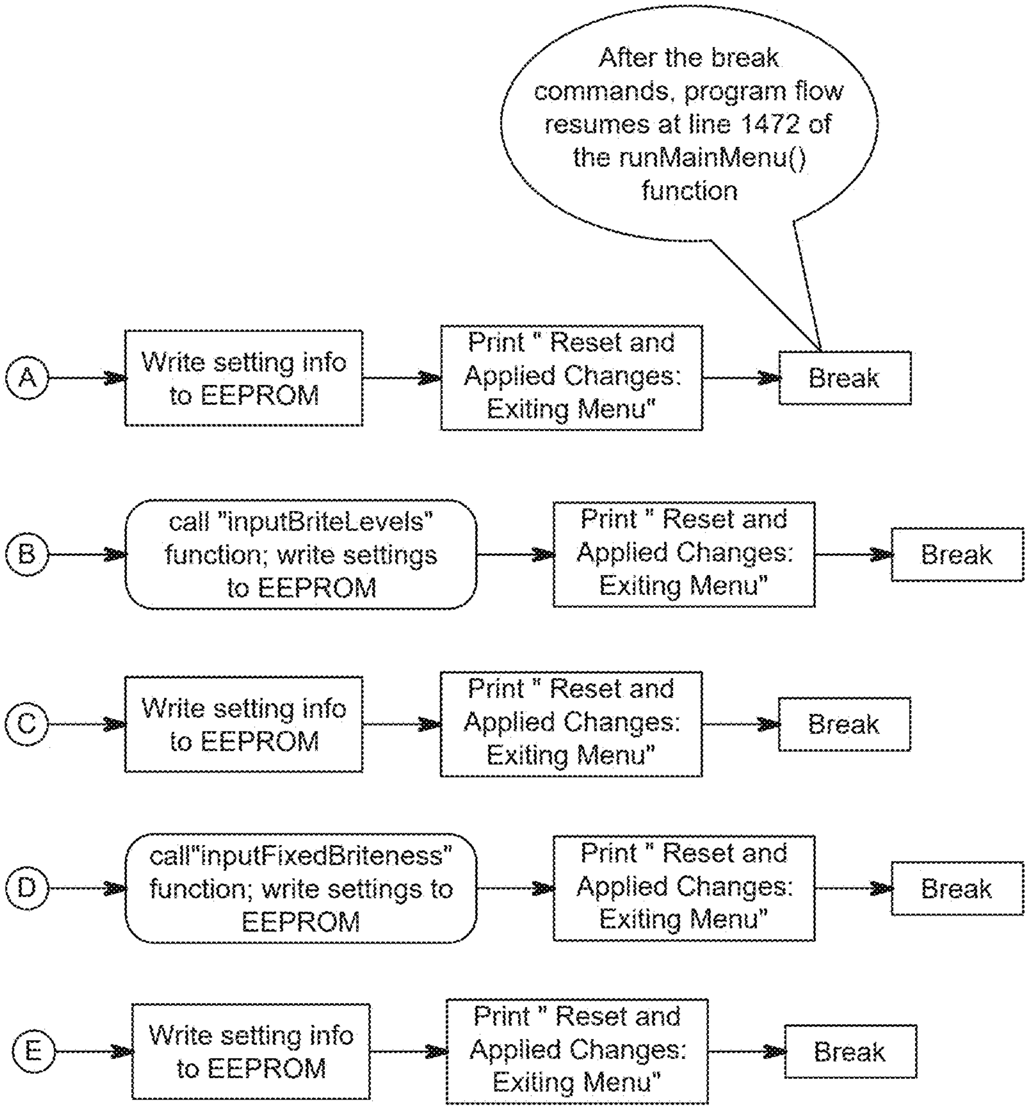

Refer to flowchart FIG. 2C. At choice "A" of the switch statement at line 1611, an embodiment includes the ability to select automatic brightness control by means of an on-board light sensor. Making choice "A" will cause the unit to operate in this mode when the CONFIG switch is placed in the PRGM position. Refer to FIG. 6A for a screenshot of this menu feature.

Refer to flowchart FIG. 2C. At choice "B" of the switch statement at line 1611, an embodiment includes the ability to change upper and lower limit illumination levels when the unit operates in the automatic brightness control mode. Choice "B" will activate a sub-menu allowing the user to set these levels, by calling the "inputBriteLevels" function. Refer to FIG. 6B for a screenshot of this menu feature.

Refer to flowchart FIG. 2C. At choice "C" of the switch statement at line 1611, an embodiment includes the ability to change the display brightness to a fixed illumination level. Making choice "C" will cause the unit to operate in this mode when the CONFIG switch is placed in the PRGM position. Refer to FIG. 6C for a screenshot of this menu feature.

Refer to flowchart FIG. 2C. At choice "D" of the switch statement at line 1611, an embodiment includes the ability to enter the fixed brightness mode illumination level. Making choice "D" will activate a sub-menu allowing the user to make entries that will determine the illumination level for the displayed characters, when the CONFIG switch is placed in the PRGM position. The user makes an entry from 1 to 100, with 100 being the brightest. Refer to FIG. 6D for a screenshot of this menu feature.

Refer to flowchart FIG. 2C. At choice "E" of the switch statement at line 1611, an embodiment includes the ability to change the display brightness control to one which uses the External PWM input pin shown in FIG. 1. Making choice "E" will cause the unit to operate in this mode when the CONFIG switch is placed in the PRGM position. Refer to FIG. 6E for a screenshot of this menu feature.

This concludes the explanation of the Light Sensor Mode/Adjustment Main Menu function.

Refer to FIG. 2B, the Main Menu flowchart. At choice "D" of the switch statement, an embodiment includes the ability to set the display into either a scrolling or non-scrolling mode. Making choice "D" will activate a sub-menu allowing the user to make an entry determining which mode of operation is desired. Making choice "D" will cause the unit to operate in this mode when the CONFIG switch is placed in the PRGM position. Refer to FIG. 5D for a screenshot of this menu feature.

Refer to FIG. 2B, the Main Menu flowchart. At choice "E" of the switch statement, an embodiment includes the ability to set the display scroll speed. Making choice "E" will activate a sub-menu allowing the user to make an entry determining what scroll speed is desired. Making choice "E" will cause the unit to operate with this scroll speed when the CONFIG switch is placed in the PRGM position. Refer to FIG. 5E for a screenshot of this menu feature.

Refer to FIG. 2B, the Main Menu flowchart. At choice "F" of the switch statement, an embodiment includes the ability to create custom characters. Making choice "F" will activate a sub-menu allowing the user to make an entries which will assign the ASCII number to the new character as well as design its shape. These custom characters will be written into the EEPROM and be made available for display immediately upon completing the design process using the UI menu. This large sub-menu is described more fully in the paragraphs 47 through 48 below.

Figure 2D:
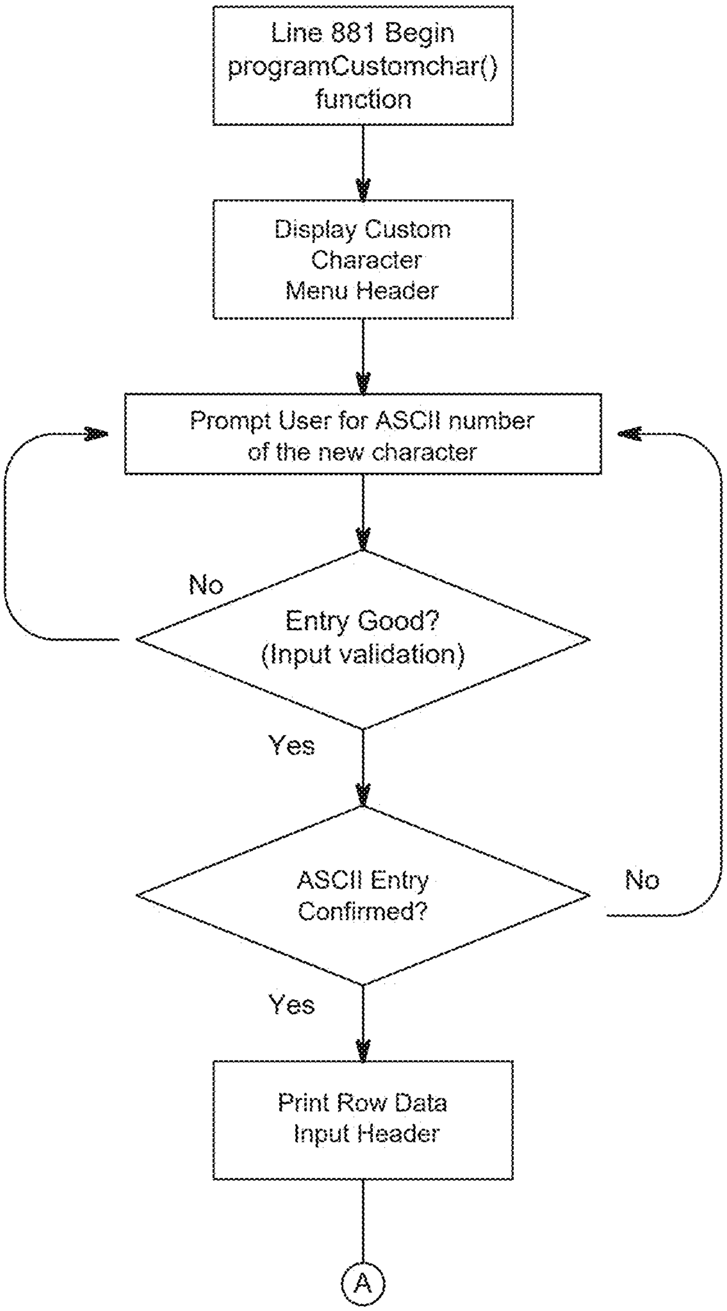
FIG. 2D is a more detailed flowchart of the device firmware, showing the custom character creation menu, in accordance with some embodiments.
Figure 2D:
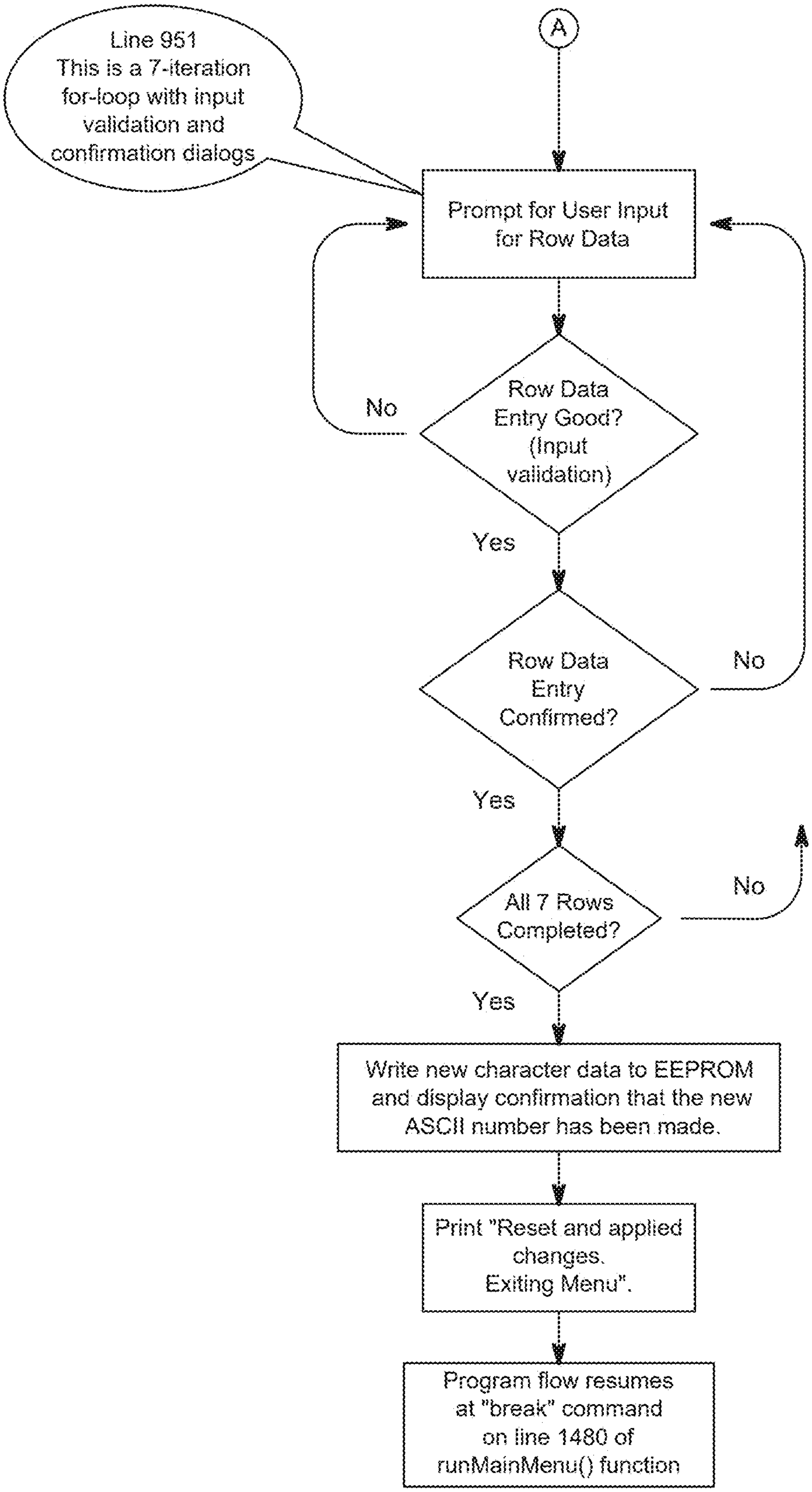

Refer to flowchart FIG. 2D, the flowchart for Custom Character Creation menu. This embodiment begins at line 881 when the menu function is invoked. After being prompted for an appropriate ASCII number for the new character, the number is accepted after passing the input validation check to ensure the entry is within range of the programming capabilities. Refer to FIG. 5F PAGE 1 for a screenshot of this menu feature.

Refer to flowchart FIG. 2D. An embodiment at line 951 is the beginning of a 7-iteration loop which is used for entering the row data for the custom character. After the ASCII number has been entered, a menu is presented to the user prompting the data entries for the individual rows. Refer to FIG. 5F for a screenshot of this menu feature. The matrix display used in this device is of the 5×7 type, and is multiplexed using successive rows. The user is asked to provide a 5-bit binary input. Each 5-bit binary input will represent the LED state for that row, with a 1 causing the LED to be lit, and a zero causing the LED to remain off. The leftmost LED in the row corresponds to the 5 bit entry MSB (the leftmost bit), and the rightmost LED corresponds to that rows' LSB (the rightmost bit). Refer to FIG. 8 which is a graphical depiction of a custom "heart" character, alongside which we see the 5-bit row entries that could be entered by the user for each row in order to create that specific custom character.

After all row entries have been completed, the program writes all the data to on-board EEPROM for use. The EEPROM is non-volatile thus data is saved after power-off cycle. The menu confirms the program has been completed, at which time program flow returns to line 1480 of the Main Menu program. Once there, a break from the switch statement occurs (FIG. 2B, Main Menu Function Flowchart) and a reset function is called. This causes the firmware to begin from the very start, with the subsequent result of the custom character data being read from the EEPROM and becoming immediately available for use-Refer to FIG. 2A line block 480-491. FIG. 5F pages 1 and 2 show the entire user interaction sequence for making the character.

In some embodiments, the display may use columnar multiplexing. In this case, the user would be prompted to enter columnar data instead of row data when creating custom characters.

Refer to FIG. 2B. In line block 1282-1434 Print Menu Header, an embodiment includes the system verifying the validity of the data stored on the on-board EEPROM. This step involves checking the data for errors or inconsistencies that could affect the display outcome. Error checking mitigates malfunctions or display errors arising from corrupt or incompatible configuration data. The firmware examines the on-board EEPROM for any out-of-range settings, which in practice can only occur if the EEPROM is programmed directly using the I2C connection. Any such errors will be displayed appropriately in the user-programmed configuration settings menu. A screenshot showing this error checking manifested in the menu display may be seen in FIG. 6F.

In some embodiments, the serial communication protocol may be utilized to transmit configuration commands from the computing device to the dot matrix character display device. These commands may include display settings, custom character definitions, and other display parameters. The dot matrix character display device then processes these commands to adjust its operation accordingly.

In some embodiments, the communication link may support bidirectional data exchange, enabling the dot matrix character display device to send feedback or status information back to the computing device. This feedback can be used for diagnostic purposes, confirmation of successful configuration changes, or monitoring the display device's status.

In some embodiments, the establishment of the communication link does not require proprietary drivers or software on the computing device. Commonly available serial terminal emulator software can be used to interact with the dot matrix character display device through the communication link. This simplifies the setup process and enhances compatibility with various computing devices.

In some embodiments, the interface operation allows for real-time feedback to the user regarding the success of the configuration adjustments. This includes confirmation messages or error notifications in cases where the device cannot fulfill a request due to incompatible settings or other errors.

In some embodiments, the graphical user interface may allow users to select languages for textual display. This selection is facilitated through a menu option wherein users specify their preferred language, resulting in the device adjusting its display settings to present text in the specified language.

In some embodiments, the multilingual support provided by the graphical user interface may accommodate the display of non-English characters and scripts, including but not limited to Chinese, Arabic, or Cyrillic scripts. This capability enables the device to display text in languages that utilize unique alphabets or symbols, supporting dynamic language switching for multilingual use cases.

In some embodiments, the provision for multilingual display in the graphical user interface enables the device to present information in multiple languages. This feature is operationalized through language selection and display settings adjustments, supporting the presentation of text in user-selected languages without altering the fundamental information content.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:

providing a graphical user interface (GUI) on a serial terminal emulator software, through a virtual COM port, for configuring display settings of a dot matrix character display device;

enabling selection of display settings through the GUI without programming code or installing proprietary software;

facilitating creation of custom characters via the GUI for display on the dot matrix character display device without programming code or installing proprietary software;

initiating access to an onboard I2C EEPROM through the GUI to program display configurations;

automatically programming the onboard I2C EEPROM based on selections within the GUI;

establishing a communication link between the dot matrix character display device and a computing device;

activating a menu function on the dot matrix character display device to access the GUI by physical interaction; and storing the configured display settings and custom characters in the onboard I2C EEPROM for retrieval and use by the dot matrix character display device;

wherein a display device operating mode is set to default mode or user configuration mode by means of a physical interaction with a toggle switch.

2. The method of claim 1, wherein the display settings comprise configuration of one or more of: a baud rate, an end of line terminator, display brightness control modes and adjustments, scrolling mode enable/disable, and scroll speed setting.

3. The method of claim 1, wherein establishing the communication link between the dot matrix character display device and the computing device is performed via a USB to 5V Serial UART adaptor cable.

4. The method of claim 1, wherein the graphical user interface allows for enabling the adjustment of brightness settings through pulse-width modulation (PWM) control, with the PWM signal being supplied by the user and an interconnection for the signal to the device being made available.

5. The method of claim 1, wherein the graphical user interface enables setting auto-brightness adjustments based on ambient light conditions detected by the dot matrix character display device.

6. The method of claim 1, wherein the graphical user interface enables setting the display brightness to a fixed illumination level.

7. The method of claim 1, wherein the graphical user interface allows for enable/disable of scrolling function.

8. The method of claim 1, wherein the graphical user interface allows for the adjustment of scroll speed.

9. The method of claim 1, wherein establishing the communication link comprises using a USB to 5V Serial UART adaptor cable.

10. The method of claim 1, wherein the display device has two different modes of operation, namely a) A default mode where the device operation configuration is fixed, and a UI menu can be called up by a physical interaction; b) A second mode of operation wherein the display device operates in accordance with a configuration specified by the user.

11. A device comprising:

an 8-character dot matrix display;

an on-board I2C EEPROM configured to store display settings and custom character data;

a menu button configured to initiate a configuration menu on a connected serial terminal emulator software when activated;

a toggle switch which causes the unit to operate either in a fixed default configuration, or in a user-defined configuration;

a cable interface for establishing two-way communication between the device and a computer;

a serial terminal emulator application configured to display the configuration menu for setting display parameters and creating custom characters without requiring code or proprietary software;

a setting within the configuration menu to adjust display features;

a feature within the configuration menu to enable users to create and store custom characters directly through the menu; and means for automatically programming the on-board I2C EEPROM using the set display configurations and custom character designs provided through the menu.

12. A system comprising:

a system for configuring a dot matrix character display, comprising:

a dot matrix character display;

an onboard I2C EEPROM configured to store display settings and custom character configurations;

a cable for establishing a communication link between the dot matrix character display and a computing device;

a virtual COM port created on the computing device;

serial terminal emulator software executed on the computing device, configured to access the dot matrix character display via the virtual COM port;

a user interface accessible within the serial terminal emulator software, enabling configuration of display settings without the requirement for coding or installing proprietary software;

a toggle switch which causes the dot matrix character display to operate in either a fixed default configuration of a user-defined configuration;

a menu button on the dot matrix character display that, when activated, initiates the user interface within the serial terminal emulator software for configuration; and means for writing the configured settings and custom characters from the serial terminal emulator software to the onboard I2C EEPROM, ensuring the display operates according to the configured settings and custom characters.

13. The system of claim 12, wherein the graphical user interface further comprises options for adjusting auto-brightness settings of the dot matrix character display device.

14. The system of claim 12, wherein the graphical user interface allows for the programming of fixed brightness settings for controlling the brightness of the dot matrix character display device.

15. The system of claim 12, wherein the graphical user interface allows enabling of a user-supplied PWM signal for control of the display brightness.

16. The system of claim 12, wherein the graphical user interface allows the selection of the end of line terminator to be used.

17. The system of claim 12, wherein the graphical user interface allows the selection of the baud rate to be used.

18. The system of claim 12, wherein the menu function is activated by a menu button located on the dot matrix character display device.

19. The system of claim 12, wherein the dot matrix character display device comprises an 8-character scrolling or non-scrolling display.

20. The system of claim 12, wherein the graphical user interface allows for setting the display to scrolling or non-scrolling mode.

21. The system of claim 12, wherein the graphical user interface allows for adjusting the scroll speed.

22. The system of claim 12, wherein the cable is a USB to 5V Serial UART adaptor cable, and wherein the system further comprises a virtual COM port creation feature through the USB to 5V Serial UART adaptor cable.

23. The system of claim 12, wherein configuration settings can be entered by manually writing integer number values into specific EEPROM addresses, wherein each EEPROM address comprises a unique single functionality.

* * * * *